Patented Mar. 14, 1950

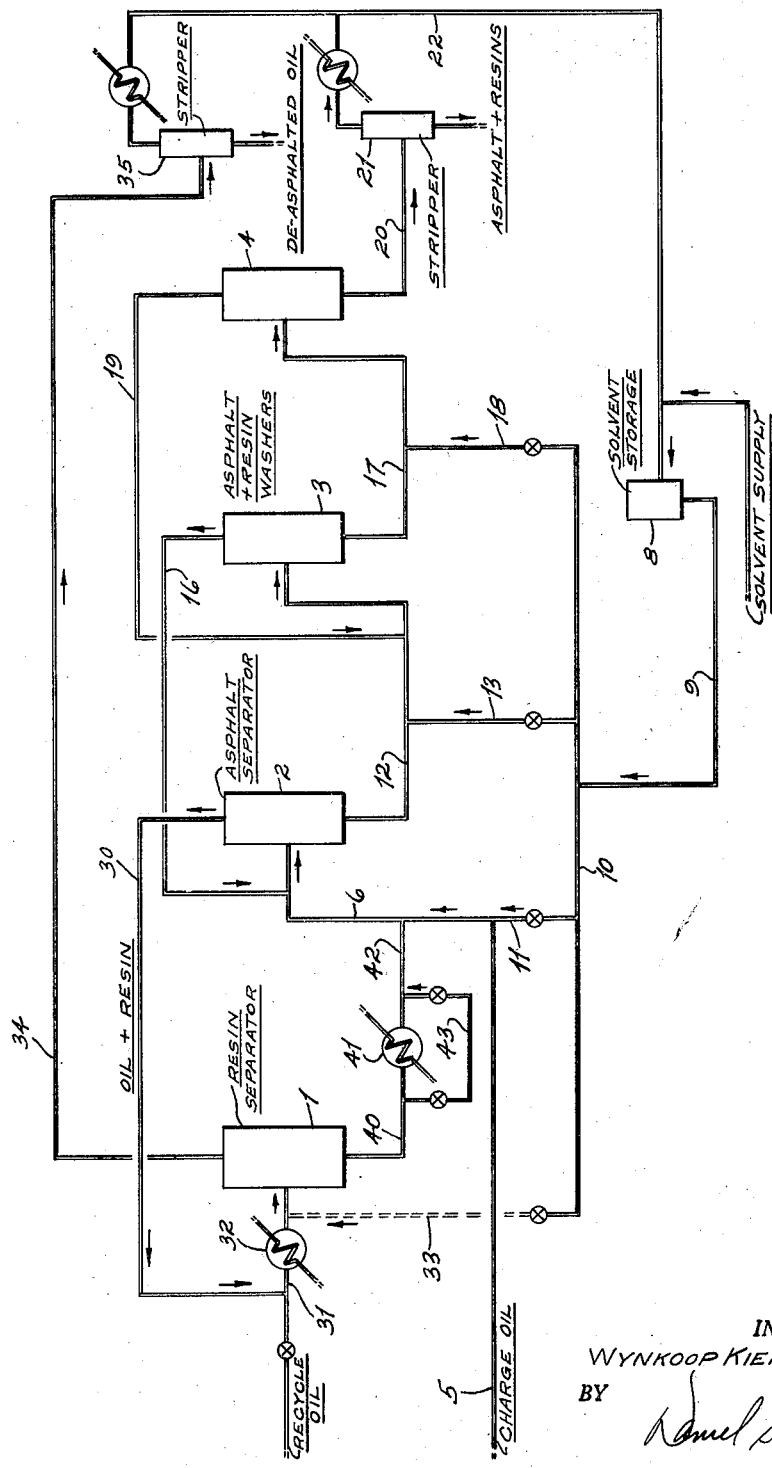

2,500,757

UNITED STATES PATENT OFFICE 2,500,757

REMOVAL OF ASPHALTIC CONSTITUENTS FROM HYDROCARBON OIL

Wynkoop Kiersted, Jr., Scarsdale, N. Y., assignor to Texaco Development Corporation, New York, N. Y., a corporation of Delaware Application March 12, 1947, Serial No. 734,092

4 Claims. (Cl. 196—13)

1

This invention relates to a method of removing asphaltic and resinous constituents from hydrocarbon oil and more particularly to the removal of such constituents from mineral lubricating oil stocks.

The invention broadly contemplates a continuous countercurrent method of removing asphaltic and resinous or hard and soft asphaltic constituents from hydrocarbon oil by extraction in a series of separate stages with a solvent liquid adapted to precipitate asphaltic constituents from the oil.

The invention has application to the deasphalting of mineral lubricating oil stocks with a solvent comprising liquified normally gaseous hydrocarbons such as propane, butane, or mixtures thereof.

In accordance with the invention, the treatment of the feed oil is effected during passage through a series of settling and separating stages arranged in series. The fresh feed oil is introduced to an intermediate stage of the series wherein it is subjected to contact with the solvent in suitable proportions and at a suitable temperature level so as to effect separation into a primary asphalt phase and a primary oil solution phase. The resulting primary asphalt phase is removed and conducted to one or more succeeding stages in the series wherein it is subjected to contact with additional solvent liquid at somewhat lower temperatures so as to effect separation of retained oil from the asphaltic and resinous material. The asphalt and resinous material mixed with some solvent is discharged from the final stage of the series while oil solution removed from the succeeding stage or stages is recycled to the aforesaid intermediate stage.

The primary oil phase removed from the intermediate stage retains a substantial amount of resinous or soft asphaltic material and this phase is conducted to a preceding or initial stage in the series maintained at a more elevated temperature such that retained resinous material precipitates from the solvent solution of oil. The precipitated material is conducted from the preceding stage to the aforesaid intermediate stage while the resulting deasphalted oil solution is separately withdrawn from the preceding stage and passes to a stripping unit for recovery of solvent liquid.

A feature of the invention thus involves conducting precipitated resinous material from the initial stage to the intermediate stage so as to increase substantially the concentration of this resinous or soft asphaltic material in the feed oil undergoing initial treatment with the solvent in the intermediate stage. It is contemplated

2 increasing the concentration of this resinous material in the feed oil in this manner by as much as 200 to 300%. In this way it is found that more effective and rapid precipitation of asphaltic material is secured with the result that the charge rate to a given plant may be increased by as much as 50% for the same quantity of circulating solvent. In other words the solvent dosage may be decreased by from 200 to 400%.

Another feature of the invention involves recycling of some deasphalted oil to the initial or preceding stage of the series. The amount so recycled is correlated with the temperature maintained in the initial stage particularly when using a liquified normally gaseous hydrocarbon. In order to maintain such a solvent liquified at elevated temperatures, substantial pressure is required which necessitates the employment of heavy equipment.

The higher the temperature, the more insoluble the resinous material. It appears, however, that effective resin separation can be secured at somewhat lower temperatures by the addition of some deasphalted oil to the resin separating stage. The addition of this oil has the effect of displacing more of the relatively insoluble material, i. e. resinous material from the oil solution. The amount of recycle oil may range from about 10 to 25% of the primary phase oil entering the resin separating stage. In order to describe the method of flow in more detail, reference will now be made to the accompanying drawing.

As indicated in the drawing, a series of separating stages designated by the numerals 1, 2, 3 and 4, respectively, may be employed. These stages are merely represented in diagrammatic form, and any suitable design may be employed which permits adequate mixing between solvent and oil and separation of resulting phases. Moreover, additional stages may be provided although at least three stages are essential.

An asphalt bearing charge oil such as residual cylinder stock derived from Mid-Continent crude is conducted from a source not shown through a pipe 5 and a pipe 6 to the intermediate stage 2. A stream of solvent liquid, i. e. propane or a propane fraction drawn from a storage tank 8 through pipes 9 and 10 is conducted through a branch pipe 11 and thus injected into the charge oil stream flowing through the pipe 6. In this way effective mixing between charge oil and solvent is effected. The solvent may be injected in the proportion of about 5 to 9 volumes of solvent per volume of charge oil.

The mixture of feed oil and solvent flows into stage 2 wherein separation into phases occurs, the temperature being maintained within the range of about 135 to 155° F. and usually at about 145 to 150° F. Under such conditions, a primary asphalt phase is formed comprising asphalt and resins mixed with a minor proportion of the solvent and some oil, and a primary oil phase comprising oil and resinous material or soft asphalt dissolved in the major portion of the solvent.

The primary asphalt phase comprising about equal parts of asphalt and propane is drawn off in a continuous stream through a pipe 12 and conducted to the succeeding stage 3. Additional solvent drawn from the pipe 10 through a branch pipe 13 is injected in the stream flowing through the pipe 12. Solvent equivalent to about 25% of the total solvent required for the treating operation is thus added to provide a mixture of about 10 to 20 or more volumes of solvent for each volume of asphalt.

The stage 3 is maintained at a temperature in the range of 125 to 135° F., so that further separation between oil and asphalt occurs. The separated oil is continuously withdrawn through a pipe 16 and recycled to stage 2 as indicated, the recycled oil advantageously being commingled with the stream of oil and solvent flowing through the pipe 6.

The partially deoiled asphalt phase formed in stage 3 is continuously drawn off through a pipe 17 to stage 4, additional solvent equivalent to about 50% of the total solvent required for the treating operation being added through branch pipe 18 so as to provide a mixture of about 20 to 40 volumes of solvent for each volume of asphalt.

Stage 4 is maintained at a temperature of about 120 to 130° F. or sufficient to effect substantially complete removal of retained oil from the asphalt and resinous material.

As in the case of the preceding stage, retained oil separated in stage 4 is continuously withdrawn through a pipe 19 and then recycled through pipe 12 and stage 3 to stage 2.

The resulting asphalt and resin mixture from which retained oil has been removed in stage 4 is continuously discharged through a pipe 20 to a stripper 21 wherein solvent is recovered from the asphalt and resin material. The recovered solvent is returned through a pipe 22 to the aforesaid storage tank, 8.

The primary oil phase accumulating in stage 2 is continuously removed through a pipe 30 and conducted to a pipe 31 and a heater or heat exchanger 32, wherein it is raised to a temperature of about 160° F. The resulting heated mixture of oil resin and solvent is introduced to stage 1 which is maintained at a temperature in the range of 155 to 165° F., and usually at about 160° F., so that precipitation of resins from the oil solution occurs. If desired, some additional solvent may be added from the pipe 10 through a branch pipe 33. However, it is contemplated that in the usual case, additional solvent will not be required.

The resulting deresinified oil solution is continuously removed through a pipe 34 and conducted to a stripper 35, wherein the solvent is recovered from the deasphalted and deresined oil. The recovered solvent may be returned through pipe 22 to the storage tank 8.

A small portion of the de-asphalted and de-resined oil may be recycled to pipe 31 for commingling with the primary oil phase passage to stage 1, and thus aid in the precipitation of resinous material from the oil.

The resin precipitate comprising about equal volumes of resinous material and solvent is drawn off through a pipe 40, exchanger 41 and pipe 42 connecting with the previously mentioned pipe 6 through which it is conducted to stage 2. The exchanger 41 may be by-passed all or in part if desired by a pipe 43.

The resin precipitate flowing through pipe 40 is added to the charge oil mixture passing to stage 2 so as to aid in obtaining more effective and rapid precipitation of asphalt and resin from the oil.

By way of example, when treating a residual cylinder stock derived from Mid-Continent crude, characterized by having an A. P. I. gravity of 21, Saybolt Universal viscosity of 220 seconds at 210° F. and a carbon residue content of 5.2%, a de-asphalted and de-resined lubricating oil stock amounting to at least 90% of the charge oil is obtained, employing conditions of temperature and solvent dosage previously indicated. The lubricating stock so obtained has an A. P. I. gravity of about 24.2, a carbon residue content of about 1.50, and a color of about 1⅛ Tag-Robinson, or higher.

By contrast, when treating the same type of feed oil under similar conditions of temperature and increased solvent dosage but without recycling the resin precipitate from stage 1 and resin bearing streams of solvent from stages 3 and 4 to stage 2, only about 83% of de-asphalted and de-resined oil of substantially the same quality is obtained. In this latter case, the resin precipitate is merely washed with additional solvent in a separate stage, for example, stage 4, while the asphalt stream from the preceding stage 3 is passed directly to a solvent recovery unit.

While the employment of elevated pressures has not been referred to specifically in describing the process, nevertheless, it is contemplated that sufficient pressure is employed in the system to maintain substantially liquid phase conditions throughout the successive stages.

Also, while mention has been made of using a liquified normally gaseous hydrocarbon as the solvent, it is contemplated that other de-asphalting solvents or agents may be employed as for example, aliphatic alcohols such as propyl, isopropyl, butyl, or isobutyl alcohols, mixtures thereof, etc.

It is contemplated that the invention has application to the treatment of other than mineral type oils for the purpose of effecting separation of resinous or higher molecular weight constituents. It may be applied to the treatment of fatty type oils derived from vegetable and animal sources.

Obviously many modifications and variations of the invention, as hereinbefore set forth, may be made without departing from the spirit and scope thereof, and therefore only such limitations should be imposed as are indicated in the appended claims.

I claim:

1. A continuous method of separating asphaltic and resinous constituents from residual lubricating oil stock containing both asphalt and resin in substantial amounts by treatment with a liquefied normally gaseous petroleum $C_3$ and higher hydrocarbon solvent in a series of stages, which comprises passing a stream of feed oil mixed with from about 5 to 9 volumes of said liquefied solvent per volume of feed oil to the second stage in said series, said stage being maintained at a temperature of about 135 to 155° F., effecting separation therein into two primary liquid phases, one of said phases comprising an asphalt phase and the other comprising an oil-solvent phase retaining resinous material, separately withdrawing said primary phases, passing withdrawn primary oil-solvent phase to the preceding stage, subjecting said primary oil-solvent phase to settling therein at a temperature of about 155 to 165° F. such that retained resinous material precipitates therefrom leaving substantially deasphalted and deresined oil, discharging resulting deasphalted and deresined oil from said preceding stage, injecting said precipitated resins into said stream of feed oil passing to said second stage in amount sufficient to increase the concentration of resins in said feed stream by about 200 to 300%, passing said primary asphalt phase mixed with solvent in the proportion of about 10 to 20 volumes per volume of asphalt to the third stage of the series maintained at a temperature of about 125 to 135° F. such that further separation into oil and asphalt phases occurs, separately withdrawing third stage oil and asphalt phases respectively, recycling withdrawn third stage oil to said second stage, passing withdrawn third stage asphalt to a final stage, subjecting it to contact in said final stage with about 20 to 40 volumes of solvent per volume of asphalt at a temperature of about 120 to 130° F. thereby effecting substantially complete deoiling of asphaltic and resinous material, discharging resulting deoiled material, and recycling resulting oil solution from said final stage to said third stage.

2. The method according to claim 1 in which a small portion of deasphalted and deresined oil is recycled to said preceding stage.

3. A continuous method of separating asphaltic and resinous constituents from residual cylinder stock derived from Mid-Continent crude containing both asphalt and resins in substantial amounts by treatment with a solvent comprising essentially liquefied propane in a series of stages thereby obtaining a lubricating oil stock having a Tag-Robinson color of $1\frac{1}{8}$ and higher which comprises passing a stream of said cylinder stock feed oil with from about 5 to 9 volumes of said solvent per volume of feed oil to the second stage in said series, said stage being maintained at a temperature of about 135 to 155° F., effecting separation therein into two primary liquid phases, one of said phases comprising an asphalt phase and the other comprising an oil-solvent phase retaining resinous material, separately withdrawing said primary phases, passing withdrawn primary oil-solvent phase to the preceding stage, subjecting said primary oil-solvent phase to settling therein at a temperature of about 155 to 165° F. such that retained resinous material precipitates therefrom leaving substantially deasphalted and deresined oil, discharging resulting deasphalted and deresined oil from said preceding stage, injecting said precipitated resins into said stream of feed oil passing to said second stage in amount sufficient to increase the concentration of resins in said feed stream by about 200 to 300%, passing said primary asphalt phase mixed with solvent in the proportion of about 10 to 20 volumes per volume of asphalt to the third stage of the series maintained at a temperature of about 125 to 135° F. such that further separation into oil and asphalt phases occurs, separately withdrawing third stage oil and asphalt phases respectively, recycling withdrawn third stage oil to said second stage, passing withdrawn third stage asphalt to a final stage, subjecting it to contact in said final stage with about 20 to 40 volumes of solvent per volume of asphalt at a temperature of about 120 to 130° F. thereby effecting substantially complete deoiling of asphaltic and resinous material, discharging resulting deoiled material, and recycling resulting oil solution from said final stage to said third stage.

4. The method according to claim 3 in which a small portion of the deasphalted and deresined cylinder stock is recycled to said preceding stage.

WYNKOOP KIERSTED, Jr.

REFERENCES CITED

The following references are of record in the file of this patent:

UNITED STATES PATENTS

| Number | Name | Date |
| --- | --- | --- |
| 2,143,872 | Forrest et al. | Jan. 17, 1939 |
| 2,143,882 | Keith et al. | Jan. 17, 1939 |
| 2,284,583 | Lewis | May 26, 1942 |
| 2,367,671 | Dickinson et al. | Jan. 23, 1945 |